United States Patent
Agrawal et al.

(10) Patent No.: US 11,169,687 B2
(45) Date of Patent: Nov. 9, 2021

(54) METHODS, SYSTEMS AND COMPUTER PROGRAM PRODUCTS FOR MAPPING INPUTS TO A SOFTWARE APPLICATION

(71) Applicant: Bluestack Systems, Inc., Campbell, CA (US)

(72) Inventors: Sharad Agrawal, Gurgaon (IN); Vivek Thakkar, Faridabad (IN); Abhisht Shukla, Dwarka (IN); Mrinal Datt, Vasant Kunj (IN)

(73) Assignee: Bluestack Systems, Inc., Campbell, CA (US)

( * ) Notice: Subject to any disclaimer, the term of this patent is extended or adjusted under 35 U.S.C. 154(b) by 0 days.

(21) Appl. No.: 16/447,018

(22) Filed: Jun. 20, 2019

(65) Prior Publication Data

US 2019/0391719 A1    Dec. 26, 2019

Related U.S. Application Data

(60) Provisional application No. 62/688,001, filed on Jun. 21, 2018.

(51) Int. Cl.
*G06F 3/0488* (2013.01)
*G06F 9/4401* (2018.01)
*G06F 3/01* (2006.01)

(52) U.S. Cl.
CPC ........... *G06F 3/0488* (2013.01); *G06F 3/016* (2013.01); *G06F 9/4411* (2013.01)

(58) Field of Classification Search
CPC combination set(s) only.
See application file for complete search history.

(56) References Cited

U.S. PATENT DOCUMENTS

| | | | |
|---|---|---|---|
| 6,429,793 B1 | 8/2002 | Paolini | |
| 6,814,510 B1 * | 11/2004 | Sabbagh | G06F 3/1204 400/61 |
| 7,116,310 B1 | 10/2006 | Evans et al. | |
| 10,268,477 B1 * | 4/2019 | Desai | G06F 8/65 |
| 2008/0250429 A1 | 10/2008 | Lockhart et al. | |
| 2012/0235921 A1 | 9/2012 | Laubach | |
| 2014/0143754 A1 * | 5/2014 | Henderson | G06F 8/355 717/108 |
| 2017/0003758 A1 * | 1/2017 | Honji | G06F 3/041 |

OTHER PUBLICATIONS

"Keyboard Input (Keyboard and Mouse Input)", Microsoft.com, May 31, 2018, 7 pages, retrieved from https://docs.microsoft.com/en-US/windows/win32/inputdev/keyboard-input.

* cited by examiner

*Primary Examiner* — Van N Chow
(74) *Attorney, Agent, or Firm* — The Webb Law Firm

(57) ABSTRACT

The invention enables mapping inputs to a software application. The invention comprises (i) receiving a keymap that correlates a first set of input events capable of being generated through an input device, with a second set of input events that are recognizable by the software application, (ii) receiving from the input device, a first data signal associated with a first input event within the first set of input events, (iii) identifying based on the received keymap, a second input event within the second set of input events, wherein the second input event is mapped to the first input event by the received keymap, (iv) generating a second data signal, wherein the second data signal is recognizable by the software application as corresponding to the second input event, and (v) implementing a state change in the software application based on the second data signal.

23 Claims, 8 Drawing Sheets

METHODS, SYSTEMS AND COMPUTER PROGRAM PRODUCTS FOR MAPPING INPUTS TO A SOFTWARE APPLICATION

CROSS-REFERENCE TO RELATED APPLICATION

This application claims the benefit of U.S. Provisional Patent Application No. 62/688,001 filed Jun. 21, 2018, the disclosure of which is hereby incorporated by reference in its entirety.

FIELD OF THE INVENTION

The present invention relates to input mappings. More particularly, the present invention relates to methods and systems of mapping inputs received from one or more controllers or user interfaces communicatively coupled to a computing system or device on which a software application is being executed to one or more instructions or events that said software application is configured to recognize.

BACKGROUND

Software applications are controlled through input devices coupled to or integrated with computing systems that are implementing or executing such software applications. These input devices enable a user to interface with the software applications and to provide control or state change instructions to software applications.

FIG. 1 illustrates an exemplary system environment 100 of a type used for implementation of one or more software applications. System environment 100 comprises computing system 102 communicably coupled with one or more input devices 104 (for example integrated or peripheral input devices such as a keyboard, a touch pad, a mouse, a game pad, a motion sensor/detector, a joystick or other form of input controller). Computing system 102 may additionally be in network communication with cloud 106 (which cloud 106 may comprise any internetwork, network backend or network backbone, for example, the internet).

Computing system 102 includes an input layer comprising a processor implemented input layer controller, a network traffic layer comprising a processor implemented network traffic layer controller 1024, a disk data layer comprising a processor implemented disk data layer controller 1026, and an application controller 1028.

Input layer controller 1022 is configured to communicate with one or more input device(s) to receive and transmit control data and/or state data from and to, input device(s) 104 to a software application being executed through computing system 102. Network traffic layer controller 1024 is configured to receive and transmit control data and/or state data between cloud 106 and the software application. Disk data layer controller 1026 is configured to retrieve control data and/or state data from one or more databases and to use such data for the purposes of executing or controlling the software application.

Application controller 1028 is communicably coupled with one or more of input layer controller 1022, network traffic layer controller 1024 and disk data layer controller 1026, and is configured to execute and control the software application based on software code corresponding to the software application, and based on data received from one or more of input layer controller 1022, network traffic layer controller 1024 and disk data layer controller 1026.

In the illustrated embodiment, application controller 1030 comprises graphics controller 1030 configured to render one or more graphic objects on a display device (e.g. a display screen), based on (i) software code corresponding to the software application and/or (ii) data received from one or more of input layer controller 1022, network traffic layer controller 1024 and disk data layer controller 1026. The illustrated application controller 1030 also includes audio controller 1032 configured to generate and control audio output through one or more audio devices (e.g. a speaker or headphones), based on (i) the software code corresponding to the software application, and/or (ii) data received from one or more of input layer controller 1022, network traffic layer controller 1024 and disk data layer controller 1026. Application controller 1028, graphics controller 1030 and audio controller 1032 may be configured to receive data from and transmit data to one or more of disk data layer controller 1026, network traffic layer controller 1024, input layer controller 1022, cloud 106 and/or input device(s) 104 for the purposes of achieving the functionality of the software application.

With increasing availability of software applications, and availability of devices and platforms on which software applications can be executed, there has been a growing demand for customization of user interfaces and user-experience. The demand for customization has been particularly felt with regard to the ability to select and use different input devices and input device controllers to control or provide inputs to software application programs which may not have been designed for use with such input devices/controllers/inputs. This is particularly the case with game related software applications, where users prefer a high level of control personalization—both in terms of devices that can be used to control the game and user inputs/user input sequences that can be used to trigger instructions or events that are recognized by the game related software applications.

It has also been found that with increasing cross-operating system runtime through virtual machine environments (which enables applications that are developed for a first operating system (for example the Android OS) to be executed on a machine running a second operating system as a host operating system (for example, the macOS™ or Windows™ operating systems)), controls that have been defined for a program written for the first operating system may be unavailable or inefficient when said program is being executed within the second operating system through the virtual machine environment.

There is accordingly a need for effective solutions to map inputs received from one or more controllers or user interfaces communicatively coupled to a computing device on which a software application is being executed, to one or more instructions or events that said software application is configured to recognize.

SUMMARY

The invention provides methods and systems of mapping inputs received from one or more controllers or user interfaces communicatively coupled to a computing system or device on which a software application is being executed to one or more instructions or events that said software application is configured to recognize.

In an embodiment, the invention comprises a method for mapping inputs to a software application. The invention comprises implementing on one or more processors, the steps of (i) receiving a keymap that correlates a first set of input events capable of being generated through an input device, with a second set of input events that are recognized by the software application, wherein the second set of input events includes one or more input events that are not included within the first set of input events, (ii) receiving from an input device within the first set of input devices, a first data signal associated with a first input event within the first set of input events, (iii) identifying based on the received keymap, a second input event within the second set of input events, wherein the second input event is mapped to the first input event by the received keymap, (iv) generating a second data signal, wherein the second data signal is recognizable by the software application as corresponding to the second input event, and (v) implementing a state change in the software application based on the second data signal.

In a further embodiment of the method, the state change implemented in the software application instantiates a corresponding state change in an output device controlled by the software application. The output device may comprise any of a display, speaker, headphone, visual feedback device, audio feedback device, illumination device, tactile feedback device, haptic feedback device, or sensory feedback device.

In embodiments of the method, (i) the first set of input events are not recognized by the software application, or (ii) the software response that is associated with the first set of input events by the software application is different from the software response that is associated with the second set of input events by the software application.

In a particular method embodiment, (i) the software application is executed within an instance of a guest operating system that is implemented within a host operating system, wherein the guest operating system and the host operating system are different from each other, (ii) the first set of input events are recognizable by a hardware device driver compatible with and executed within the host operating system, and (iii) the second set of input events are (a) recognizable by the software application being executed within the instance of the guest operating system or (b) recognized by a hardware device driver within an operating system kernel of the guest operating system, or (c) recognized by the guest operating system.

In a method embodiment, the second data signal is transmitted to the software application within the guest operating system from a host operating system application software that instantiates and controls the instance of the guest operating system that is being implemented within the host operating system.

The method may further comprise generating on a display controlled by the software application (a) a first set of graphic objects defined by or selected based on a state of the software application, and (b) a second set of graphic objects overlaid upon one or more graphic objects within the first set of graphic objects, wherein one or more graphic objects within the second set of graphic objects represent one or more input events within the first set of input events.

In another method embodiment, the second set of graphic objects comprises (i) a visual representation of one or more data elements retrieved from the received keymap, or (ii) a visual representation of one or more input controls that are enabled to generate input events within the first set of input events.

In embodiments of the method, (i) one or more input events within the second set of input events are touchpress events initiated through a touchscreen interface, and (ii) a graphic object within the second set of graphic objects is overlaid on the touchscreen display, at a defined position relative to a region of the display screen that has been defined by the software application for the purposes of initiating a touchpress event within the second set of input events, and which touchpress event is correlated by the received keymap with an input event within the first set of input events that corresponds to said graphic object.

In another embodiment, the received keymap is selected from among a plurality of keymaps—wherein the selection of the received keymap is responsive to detection of one or more predefined state parameters, and the one or more predefined state parameters are hardware or software state parameters.

The detected one or more predefined state parameters in a method embodiment may comprise any of a visual display state parameter, an audio state parameter, a state parameter corresponding to data stored in memory, a state parameter corresponding to data received over a network, a state parameter corresponding to input received from a hardware device, or a state parameter corresponding to any computing system or computing system environment associated with execution of the software application.

In a specific method embodiment, the software application is executed within an instance of a guest operating system that is being implemented within a host operating system, wherein (i) the guest operating system and the host operating system are different from each other, (ii) the first set of input events are recognizable by a hardware device driver compatible with and executed within the host operating system, (iii) the second set of input events are (a) recognizable by the software application being executed within the instance of the guest operating system or (b) recognized by a hardware device driver within an operating system kernel of the guest operating system; or (iii) recognized by the guest operating system, and (iv) one or more of the detected state parameters are detected based on data, a request or an instruction received at, or from, any of (c) an application framework layer within the instance of the guest operating system, (d) a library layer within the instance of the guest operating system, (c) a hardware abstraction layer within the instance of the guest operating system, (d) an application program executed within an application program layer in the guest operating system, (e) the host operating system through a data channel established between the instance of the guest operating system and a host operating system application software that instantiates and controls the instance of the guest operating system that is being implemented with the host operating system, or (f) the host operating system application software from a host operating system device driver.

In another embodiment, the invention provides a system for mapping inputs to a software application. The system comprises a processor implemented computing system configured for (i) receiving a keymap that correlates a first set of input events capable of being generated through an input device, with a second set of input events that are recognized by the software application, wherein the second set of input events includes one or more input events that are not included within the first set of input events, (ii) receiving from an input device within the first set of input devices, a first data signal associated with a first input event within the first set of input events, (iii) identifying based on the received keymap, a second input event within the second set of input events, wherein the second input event is mapped to the first input event by the received keymap, (iv) generating a second data signal, wherein the second data signal is recognizable by the software application as corresponding to the second input event, and (v) implementing a state change in the software application based on the second data signal.

In a system embodiment, the state change implemented in the software application instantiates a corresponding state change in an output device controlled by the software application.

The output device may comprise any of a display, speaker, headphone, visual feedback device, audio feedback device, illumination device, tactile feedback device, haptic feedback device, or sensory feedback device.

In further system embodiments, (i) the first set of input events are not recognized by the software application, or (ii) the software response that is associated with the first set of input events by the software application is different from the software response that is associated with the second set of input events by the software application.

The software application may be executed within an instance of a guest operating system that is implemented within a host operating system, wherein (i) the guest operating system and the host operating system are different from each other, (ii) the first set of input events are recognizable by a hardware device driver compatible with and executed within the host operating system, and (iii) the second set of input events are (a) recognizable by the software application being executed within the instance of the guest operating system or (b) recognized by a hardware device driver within an operating system kernel of the guest operating system, or (c) recognized by the guest operating system.

In a system embodiment, the second data signal is transmitted to the software application within the guest operating system from a host operating system application software that instantiates and controls the instance of the guest operating system that is being implemented within the host operating system.

The system may be configured for generating on a display controlled by the software application (a) a first set of graphic objects defined by or selected based on a state of the software application, and (b) a second set of graphic objects overlaid upon one or more graphic objects within the first set of graphic objects, wherein one or more graphic objects within the second set of graphic objects represent one or more input events within the first set of input events.

In a system embodiment, the second set of graphic objects comprises (i) a visual representation of one or more data elements retrieved from the received keymap, or (ii) a visual representation of one or more input controls that are enabled to generate input events within the first set of input events.

In a further system embodiment, (i) one or more input events within the second set of input events are touchpress events initiated through a touchscreen interface, and (ii) a graphic object within the second set of graphic objects is overlaid on the touchscreen display, at a defined position relative to a region of the display screen that has been defined by the software application for the purposes of initiating a touchpress event within the second set of input events, and which touchpress event is correlated by the received keymap with an input event within the first set of input events that corresponds to said graphic object.

In another system embodiment, the received keymap is selected from among a plurality of keymaps, wherein the selection of the received keymap is responsive to detection of one or more predefined state parameters, and the one or more predefined state parameters are hardware or software state parameters.

The detected one or more predefined state parameters may comprise any of a visual display state parameter, an audio state parameter, a state parameter corresponding to data stored in memory, a state parameter corresponding to data received over a network, a state parameter corresponding to input received from a hardware device, or a state parameter corresponding to any computing system or computing system environment associated with execution of the software application.

The system may be configured such that the software application is executed within an instance of a guest operating system that is being implemented within a host operating system, wherein (i) the guest operating system and the host operating system are different from each other, (ii) the first set of input events are recognizable by a hardware device driver compatible with and executed within the host operating system, (iii) the second set of input events are (a) recognizable by the software application being executed within the instance of the guest operating system or (b) recognized by a hardware device driver within an operating system kernel of the guest operating system; or (c) recognized by the guest operating, system and (iv) one or more of the detected state parameters are detected based on data, a request or an instruction received at, or from, any of (a) an application framework layer within the instance of the guest operating system, (b) a library layer within the instance of the guest operating system, (c) a hardware abstraction layer within the instance of the guest operating system, (d) an application program executed within an application program layer in the guest operating system, (e) the host operating system through a data channel established between the instance of the guest operating system and a host operating system application software that instantiates and controls the instance of the guest operating system that is being implemented with the host operating system, or (f) the host operating system application software from a host operating system device driver.

The invention also provides a computer program product for mapping inputs to a software application. The computer program product comprises a non-transitory computer usable medium having computer readable program code embodied therein, the computer readable program code comprising instructions for implementing at a processor, the steps of (i) receiving a keymap that correlates a first set of input events capable of being generated through an input device, with a second set of input events that are recognized by the software application, wherein the second set of input events includes one or more input events that are not included within the first set of input events, (ii) receiving from an input device within the first set of input devices, a first data signal associated with a first input event within the first set of input events, (iii) identifying based on the received keymap, a second input event within the second set of input events, wherein the second input event is mapped to the first input event by the received keymap, (iv) generating a second data signal, wherein the second data signal is recognizable by the software application as corresponding to the second input event, and (v) implementing a state change in the software application based on the second data signal.

BRIEF DESCRIPTION OF THE ACCOMPANYING DRAWINGS

DETAILED DESCRIPTION

The present invention enables mapping of inputs received from one or more controllers or user interfaces communicatively coupled to a computing system or device on which a software application is being executed, to one or more instructions or events that the software application is configured to recognize.

Figure 1:
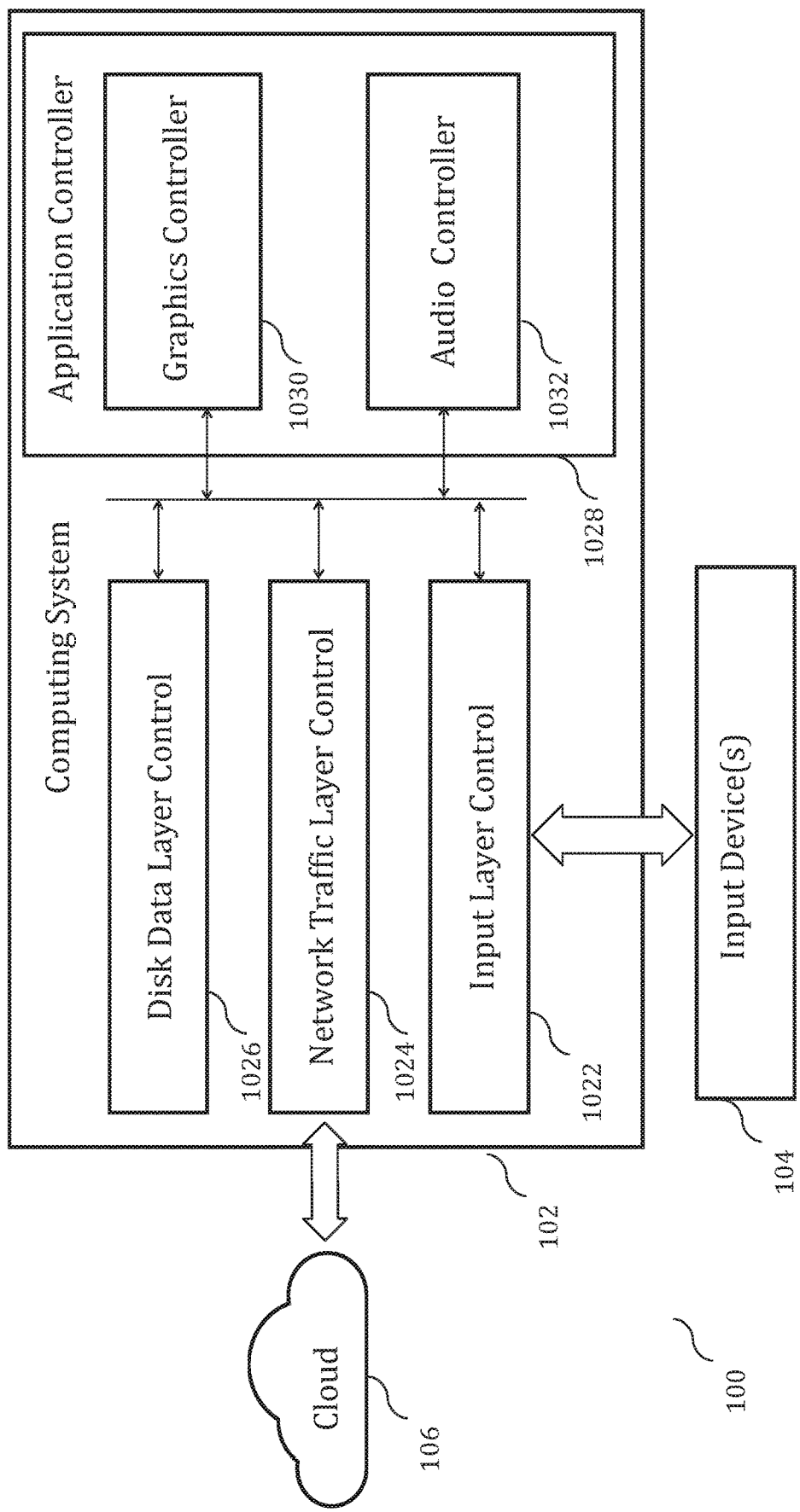
FIG. 1 illustrates an exemplary system environment for executing a software application.

The present invention may be implemented through a computing system of the type illustrated in FIG. 1 (briefly discussed above).

Figure 2:
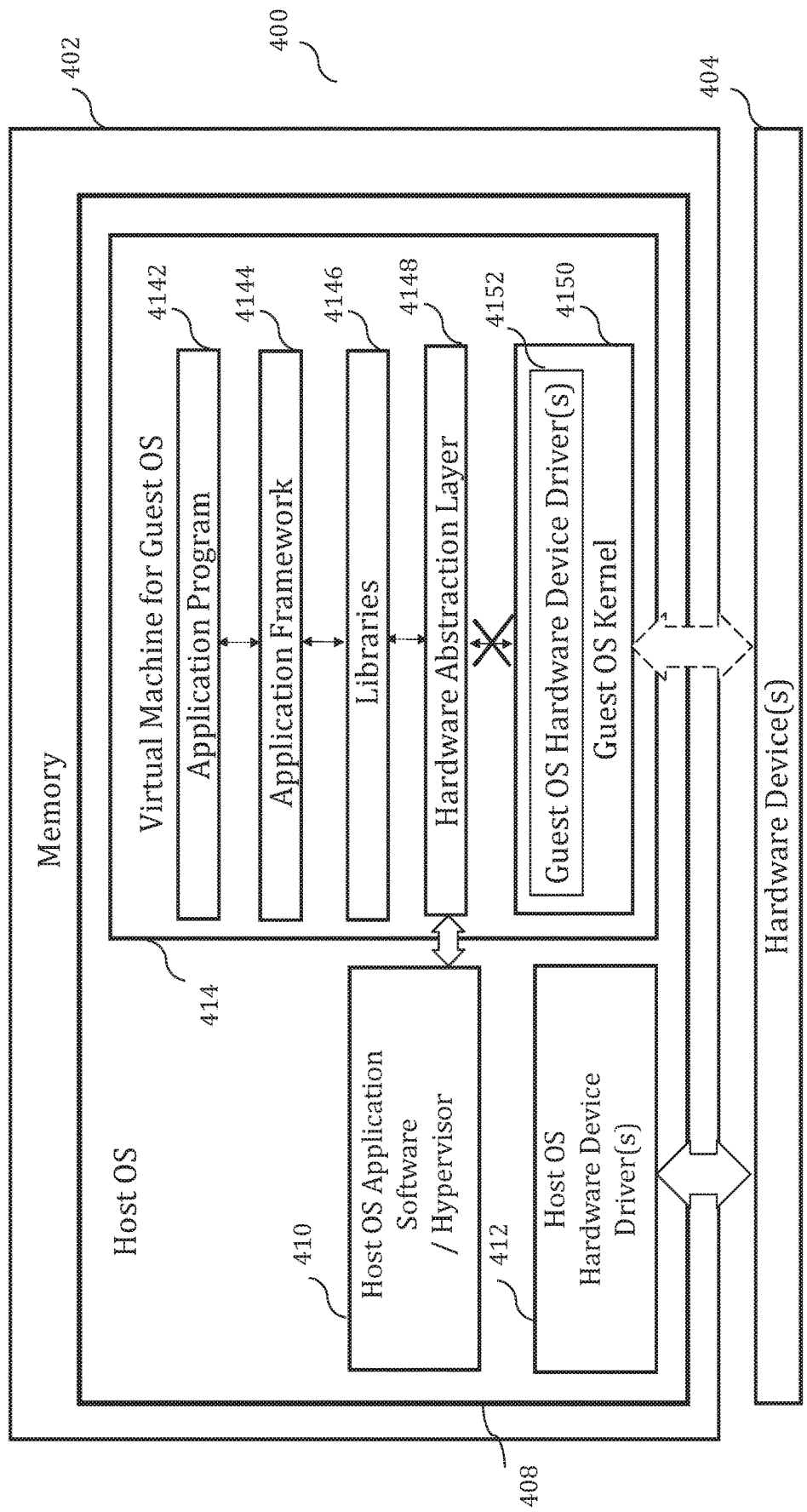
FIG. 2 illustrates an exemplary system for a computer implemented architecture configured for execution of application software that is written or compiled for runtime execution within a guest operating system inside of a host operating system.

In a more particular embodiment, the computing system that is used to implement or execute a software application in accordance with the teachings of the present invention may comprise a computer system architecture configured for execution of a virtual instance of a guest operating system within a host operating system running on the computer system architecture, and further configured to enable run-time execution of a software program written for the guest operating system, within the virtual instance of said guest operating system within the host operating system. FIG. 2 illustrates an exemplary embodiment of a computer system architecture 200 that includes a guest operating system architecture (for example, Android architecture) and a host operating system architecture (for example, a Windows/macOS architecture).

As illustrated in FIG. 2, computer system architecture 200 comprises a memory 202, one or more hardware devices 204, and one or more processors 206 communicatively coupled to each other. Memory 202 has loaded or stored therewithin a host operating system 208. The guest operating system implemented within the computer system architecture 200 is a virtual instance of an operating system that is launched by executing a host operating system software application 210 configured to emulate a hardware architecture capable of implementing the guest operating system—which host operating system software application 210 is alternatively referred to as a virtual software or a hypervisor. Executing the hypervisor creates an instance 214 of a virtual machine on which the guest operating system can be run in a manner that is transparent to the end user.

The generated instance of the guest operating system 214 may include a software stack including one or more of an application program layer 2142, an application framework layer 2144, a libraries layer 2146, a hardware abstraction layer (HAL) 2148, and a kernel layer 2150. The application program layer 2142 includes various software applications. The application framework layer 2144 is used by developers to access framework application programming interfaces (APIs) and manage the basic functions of a mobile device, laptop, or tablet on which the guest operating system is executed, such as resource allocation, switching between processes or programs, phone applications, and keeping track of the physical location of computing system (e.g. the executing phone/laptop/tablet). The application framework layer 2144 may include various managers, including an activity manager, a window manager, a content provider manager, a view system manager, a package manager, a telephony manager, a resource manager, a location manager, and a notification manager.

The library layer 2146 includes libraries written, e.g., in C, C++, etc., and is used by various systems. The libraries instruct the device executing the guest operating system on how to handle different kinds of data and are exposed to developers via the application framework. In an exemplary embodiment, where the guest operating system is Android, libraries may include, e.g., a surface manager, a media framework library, an SQLite library, an Open GL/ES library, a Free Type library, a WebKit library, an SGL library, an SSL library, and an libc library.

The hardware abstraction layer 2148 provides a standard way to create software hooks (code used to alter or augment the behavior of an operating system, of applications, or of other software components by intercepting function calls or messages or events passed between software components) between the guest operating system platform stack and the underlying hardware. The hardware abstraction layer 2148 also acts as an abstraction layer between the hardware and the rest of the software stack.

Guest operating system kernel layer 2150 includes guest operating system memory management programs, security settings, power management software and several drivers, such as the device driver for hardware, file system access, networking, and inter-process-communication. In the illustrated embodiment, guest operating system kernel layer 2150 includes at least guest operating system hardware device drivers 2152.

Typically in operation, when an operating system such as the guest operating system is being run directly as a host operating system on a computing system, an instruction from the guest operating system software application to a hardware device 204 (for example an audio or display device) would be routed to a hardware device driver 2152 within the corresponding guest operating system kernel layer 2150—which driver would thereafter control the operation of the hardware device 204 based on the received instruction. However, in the illustration shown in FIG. 2, since the virtual instance of the guest operating system 214 is launched from within the host operating system 208, the virtual instance of the guest operating system 214 would be run within the host operating system 208 as a process or a plurality of processes. Any instruction generated by an application program being executed within application program layer 2142 of the virtual instance of the guest operating system 214, to access the hardware through the device drivers 2152 within guest operating system kernel 2150 would be inoperative/meaningless to the host operating system 208, because such access is outside of the scope of the host operating system 218. Thus, a request for data or an instruction from an application program being executed within virtual instance of the guest operating system 214 would not be sent from the hardware abstraction layers 2148 to the guest operating system kernel layer 2150 (as illustrated by the crossed out communication link in FIG. 2), since the guest operating system kernel's hardware device drivers 2152 would be unable to fulfil the request or instruction—which would in turn result in an unintended state of the hardware or in malfunctioning of the hardware.

Instead, such request or instruction would be routed from hardware abstraction layer 2152 within virtual instance of the guest operating system 214 to the host operating system application software 210 via one or more of the application framework layer 2144, the library layer 2146, the hardware abstraction layer 2148 and a data channel between the hardware abstraction layer 2148 and the host operating system application software 210—which data channel is configured to enable a request or instruction from an application program that is being executed within virtual instance of the guest operating system 214, to be relayed to the host operating system application software 210.

The host operating system application software 210 is an application associated with the host operating system 208, which is executed by a host operating system processor through the host operating system 208. Through the host operating system application software, applications of the guest operating system are able to access the hardware and system data of the host operating system 208, including hardware devices 204 coupled with the host operating system processor and that are controlled through the host operating system.

The request or instruction received via the data channel is forwarded from the host operating system application software 210 to a hardware driver 212 controlled by host operating system 208. The hardware driver 212, in turn accesses the relevant hardware device 204 via a hardware abstraction layer of the host operating system (not shown). The hardware device data or a hardware device acknowledgement of a control instruction or a hardware device confirmation regarding execution of a control instruction, is read and sent back to the host operating system application software 210 via the hardware driver 212 controlled by the host operating system—and this hardware device data/acknowledgement of a control instruction/confirmation regarding execution of a control instruction, may in turn be routed to the application program that is being executed within virtual instance of the guest operating system 214 that requested the data or initiated the control instruction. Once the data/acknowledgement/confirmation is made available to the hardware abstraction layer 2148 of the guest operating system, the other higher level layers of said guest operating system, including the library layer 2146 and the application framework layer 2144 within the virtual machine would work as expected.

Figure 3:
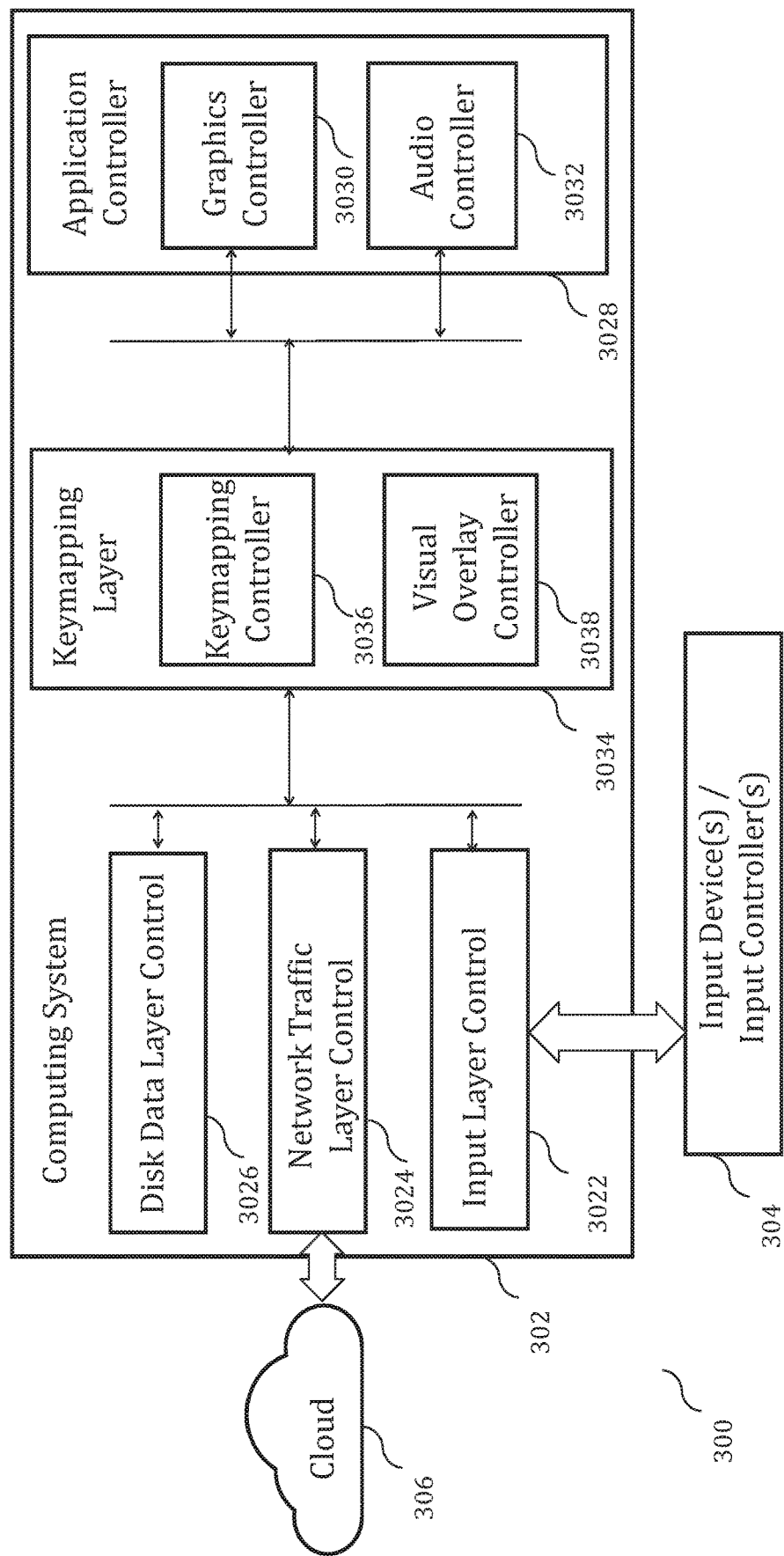
FIGS. 3 and 4 illustrate exemplary system environments for executing a software application within computing systems configured to implement the present invention.

FIG. 3 illustrates an embodiment of a system environment 300 of the type that has been more generally discussed in connection with FIG. 1—and which has been specifically configured to implement the present invention. System environment 300 comprises computing system 302 communicably coupled with one or more input devices 304 (for example integrated or peripheral input devices such as a keyboard, a touch pad, a mouse, a game pad, a motion sensor/detector, a joystick or other form of input controller). Computing system 302 may additionally be in network communication with cloud 306 (which cloud 306 may comprise any internetwork, network backend or network backbone, such as the internet).

Computing system 302 is configured to implement or execute a desired software application—for example a game software application. In the illustrated embodiment, computing system 302 comprises (i) input layer controller 3022 configured to interface with one or more input devices 304 and to receive user inputs, (ii) network traffic layer controller 3024 configured to serve as an interface between the computing system and a network (for example the internet) and to enable receiving and sending of network communications at and from the computing system (iii) disk data layer controller 3026 configured to handle data stored on a disk (or on other non-transient storage) associated with the computing system, and (iv) application controller 3028 configured to execute and control the software application based on software code corresponding to the software application, and/or based on data received from one or more of input layer controller 3022, network traffic layer controller 3024 and disk data layer controller 3026—and which application controller 3028 further includes (a) graphics controller 3030 configured to translate software application program instructions to machine level instructions capable of being interpreted and implemented by a display controller coupled to the computing system 302, and (b) audio controller 3032 configured to translate software application program instructions to machine level instructions capable of being interpreted and implemented by an audio controller coupled to the computing system 302.

The computing system 302 may be communicatively coupled with one or more input devices/input controllers 304, which may variously include one or more of a keyboard, a mouse, or any other input device or game controller including without limitation, a game pad, paddle, joystick, trackball, throttle quadrant, directional controller, touch pad, directional pad or motion sensor based controller.

In addition to the above, it will be noted that the computing system 302 of system environment 300 includes a keymapping layer 3034 that may be configured as a communication intermediate layer or as a gateway layer that is communicably interposed between (i) application controller 3028, or graphics controller 3030, or audio controller 3032 on the one side, and (ii) one or more of input device(s) 304, input layer controller 3022, network traffic layer controller 3024, disk data layer controller 3026 and cloud 306 on the other side.

Keymapping layer 3034 comprises one or both of keymapping controller 3036 and visual overlay controller 3038—the functionality of each of which is described in more detail below.

For the purposes of this written description, it would be understood that the terms "keymap" or "keymapping" are interchangeable with "input map" or "input mapping" respectively, and references to mapping of any key(s) are not intended to be limited to inputs received from a keyboard—but rather encompass any input event received from an input device capable of being coupled with and used to provide user inputs to a computing device.

The keymapping controller 3036 within keymapping layer 3034 is, in an embodiment, configured to translate inputs received from one or more input devices 304 to instructions or events capable of being detected and interpreted by a software application/game application being executed on the computing system 302. For example, in a game application being executed at a computing system, keymapping controller 3036 may be configured to translate inputs received through keypress events on a keyboard into touch actions that require input through a touch pad or touch screen (for example running, shooting etc.) or to tilt based actions that require input through a device having an accelerometer provided therein (for example, turning, banking etc.).

It would be understood that the keymapping events discussed above are simply exemplary, and are not intended to be exhaustive—and that the keymapping contemplated by the present invention may address a variety of other objectives, including substitution of one set of input controls with another set of input controls, enabling a software application to receive interpretable inputs from one or more input devices that the software application has not been coded to receive input from, or defining a macro to enable a single input event to execute a plurality of instructions or events within a software application under execution.

In an embodiment of the invention, the keymapping controller may be configured to translate inputs received from one or more input devices 304 to instructions or events capable of being detected and interpreted by a software application/game application being executed on the computing system 302 based on one or more lookup tables, or one or more substitution tables, or based on any other data records that enable correlation of inputs received from one or more input devices 304 with instructions or events capable of being detected and interpreted by a software application/game application being executed on the computing system 302.

The visual overlay controller 3038 is configured to overlay on one or more display screens generated by a software application/game application, a current keymap or other visual indication(s) regarding keys or input controls that have been associated with specific application related functionality through the keymapping controller 3036. For example, in a game application where the application code interprets detection of a touch event (on a touch screen or touch pad) at a defined region of the touch screen as an instruction for a player's avatar to move in a particular direction, and where the keymapping controller 3036 has mapped a specific keyboard key to the same touch event, the visual overlay controller 3038 may be configured to overlay a character corresponding to the specified keyboard key at, or in the vicinity of, or at a defined position relative to, the region of the display screen that that has been defined by the application code for the purposes of initiating the touch event.

By configuring the visual overlay controller to provide visual overlays of the type described above, a user controlling a software application receives a visual map to the keys/controls that have been activated by the keymapping controller 3036 and which keys can be used to initiate specific software application events or control instructions.

Figure 4:
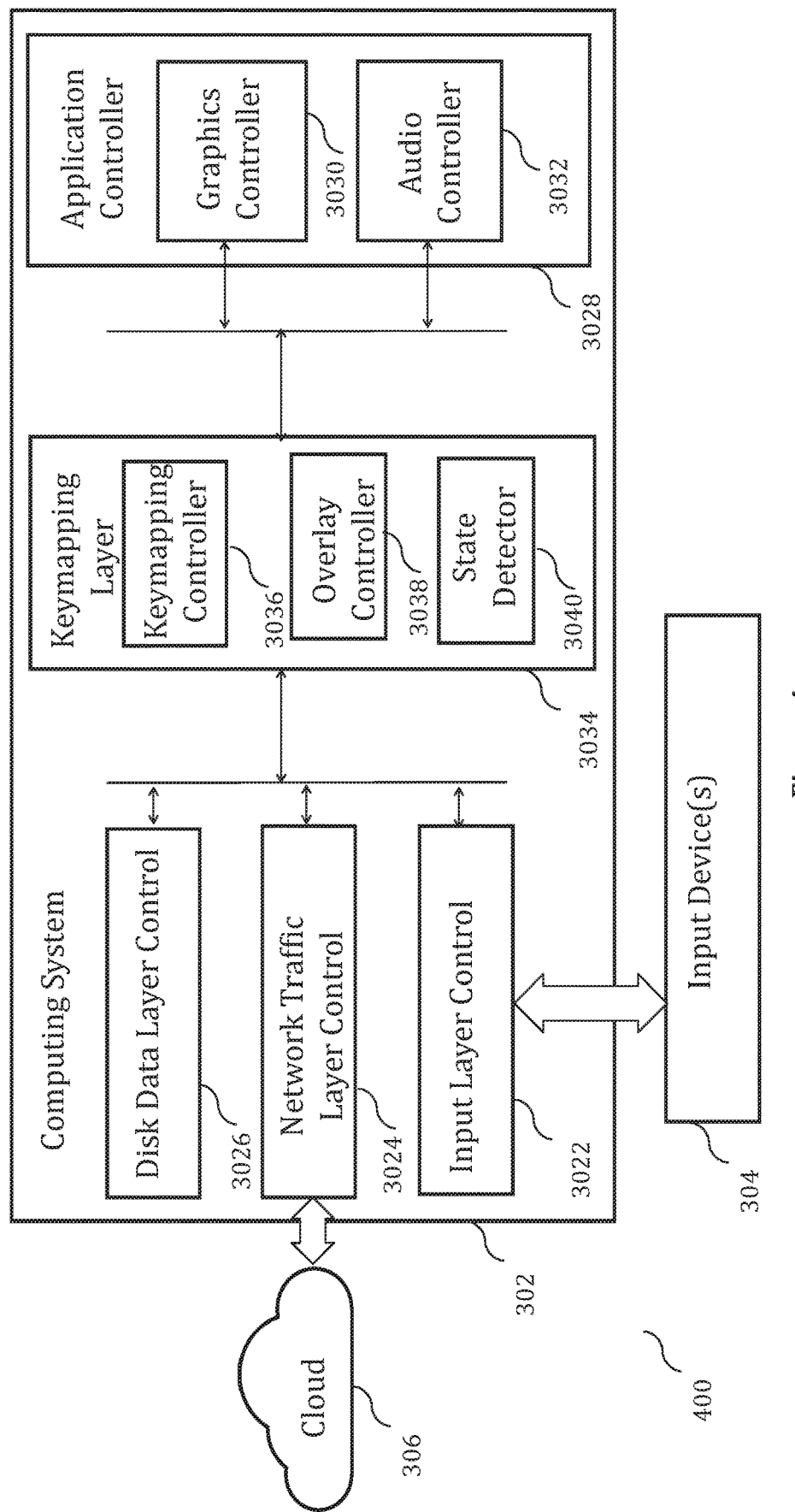

In an embodiment of the invention illustrated in FIG. 4, keymapping layer 3034 additionally includes a state detector 3040—and keymapping controller 3036 may be configured for adaptive keymapping i.e. for event or parameter based selection of a particular keymap/keymapping profile from among a plurality of keymaps/keymapping profiles. In other words, the keymapping controller 3036 may be configured to implement a first keymap (i.e. a first set of keymapping associations between user inputs and software application instructions/events) in response to detection of a first state, or detection of a first parameter or a first set of parameters, and to implement a second keymap (i.e. a second set of keymapping associations between user inputs and software application instructions/events) in response to detection of a second state, or detection of a second parameter or a second set of parameters. The states or parameter(s) that are determinative of keymaps selected and implemented by keymapping controller 3036 for the purpose of implementing adaptive keymapping may be detected by state detector 3040 within keymapping layer 3034.

In a further embodiment of the invention, the visual overlay controller 3038 may be configured for adaptive overlaying of keymaps in response to event or parameter based selection of a particular keymap by keymapping controller 3036.

In an embodiment, keymapping controller 3036 switches from a first keymap or keymap profile to a second keymap or keymap profile based on detection of one or more predefined states or state changes by state detector 3040. Exemplary state changes that may be used for the purposes of initiating a switch from a first keymap to a second keymap include state changes in one or more of a graphic state/visual display state, audio state, a state of application data/game data on disk, a state of data received over a network, or a state of input received from the cloud. Each of these state changes is described briefly below.

Keymap switching based on a graphic state/visual display state—in an embodiment, selection of a specific keymap/keymap profile may be responsive to detection of (i) predefined display screen(s), (ii) predefined graphic objects displayed on a screen or (iii) a combination of predefined graphic objects displayed in a manner that satisfies a defined set of conditions. For example, in a software application comprising a first person shooter game, a first keymap may associate the keyboard key "d" with dropping a character's weapon, while a second keymap may associate the same keyboard key "d" with driving a vehicle. In this embodiment, the first keymap may be the default keymap selected for as long as the character is displayed carrying a weapon, while the system may automatically switch from the first keymap to a second keymap when the character is positioned on screen within a predefined distance from a vehicle.

Keymap switching based on an audio state—in an embodiment, selection of a specific keymap/keymap profile may be responsive to detection of predefined sound data being communicated by the software application to an audio controller for playback to the user or from the audio controller back to the software application as an acknowledgement or confirmation of execution of instructions received from the software application. For example, in a software application comprising the first-person shooter game discussed above, detection of sound data indicative of rain may result in selection of a keymap or keymap profile that enables utilization of powers or abilities that are only available to a during gameplay in a rainy environment.

Keymap switching based on a state of game data on disk—in an embodiment, selection of a specific keymap/keymap profile may be responsive to detection of one or more software application parameters that are retrieved from data parameters stored on disk. For example, in a particular game application, a player's abilities and functions available to the player may depend on the level/stage of the game to which the player has progressed, or may depend on the experience points or experience level accumulated with the player. This information may be retrieved from the local disk of the computing device on which the game is being played, and a keymap that provides the necessary keys for full implementation of all abilities and functions available to the player at that level/stage/experience can be selected for implementation.

Keymap switching based on a state of network traffic—in an embodiment, selection of a specific keymap/keymap profile may be responsive to detection of one or more software application parameters that are retrieved from data parameters received over a network. For example, in a particular game application, a player's abilities and functions available to the player may depend on the level/stage of the game to which the player has progressed, or may depend on the experience points or experience level accumulated with the player. This information may be periodically retrieved from a server with which the game play device is in network communication, and a keymap that provides the necessary keys for full implementation of all abilities and functions available to the player at that level/stage/experience can be selected for implementation based on the data parameters received from the network server.

Keymap switching based on a state of input received from the cloud—in an embodiment, selection of a specific keymap/keymap profile may be responsive to receiving one or more data parameters that have been generated and stored on a cloud server based on analysis of session data collected across multiple sessions involving a user or a software application. For example, in a particular game application that offers a first keymapping profile for a left handed player and a second keymapping profile for a right handed player, a cloud server associated with a particular game or game platform or software emulation platform may have detected that a specific user has selected the left handed keymapping profile over the last three sessions—which information may be used to automatically select the left handed keymapping profile for the next session of game play that is initiated responsive to detection of a session login event involving the same user.

It would be understood that in certain embodiments adaptive keymapping may be accompanied by adaptive visual overlaying—to display the particular keymap (or information or graphics objects associated with the particular keymap) that has been adaptively selected for implementation.

It would also be understood that in certain embodiments, one or more of the keymapping profiles available for selection or adaptive selection may include keymaps that implement one-to-many functionality (i.e. macro functionality) wherein a single input event may be defined so as to result in execution of a plurality of instructions or events within a software application under execution. For example, in a game application involving a player with multiple weapons, a single keypress event may be defined to trigger a firing combination consisting of a first firing event using a first weapon, substituting the first weapon for a second weapon and then a second firing event using a second weapon. Defining such one-to-many functionality results in more efficient gameplay, as a skilled user can define her/his own keymaps for reducing reaction time and improving gameplay outcomes.

In a further embodiment of the invention, detection of one or more of the above discussed changes in state that are associated with a software application may be used to provide visual, audio or haptic feedback to the user—for example, via selecting or changing a state of illumination of lights on a keyboard, a vibration state on a keyboard mouse or a touch pad, an illumination state or illumination level of a display screen, or an illumination state or illumination level of keyboard backlights. In a particular embodiment, such feedback may be generated and/or controlled by application controller 3038—which may in turn rely on one or more of graphics controller 3030, audio controller 3032, a display controller, an input device controller, an illumination controller, or a haptic controller.

In an embodiment of the invention, the invention may be implemented within a computing system having an architecture of the type illustrated in FIG. 2 (i.e. a computer implemented architecture that enables execution of application software that is configured for execution on an instance of a guest operating system that has been instantiated within a host operating system). In various such embodiments— keymap switching based on a graphic state or visual display state may involve selection of a specific keymap/keymap profile in response to detection of (i) predefined display screen(s), (ii) predefined graphic objects displayed on a screen or (iii) a combination of predefined graphic objects displayed in a manner that satisfies a defined set of conditions—wherein detection of one or more of the above may be based on data, request(s) or instruction(s) received:
  at any of guest operating system application framework layer 2144, guest operating system library layer 2146, or guest operating system hardware abstraction layer 2148 within the virtual machine 214, from an application program under execution within the application program layer 2142 in the virtual machine 214, or
  at the host operating system 208 through the data channel established between the virtual machine 214 and the host operating system application software 210, or
  at the host operating system application software 210 from a host operating system hardware device driver 212.

keymap switching based on an audio state may involve selection of a specific keymap/keymap profile in response to detection of predefined sound data or instructions or requests being communicated by the application program to an audio controller or audio device driver (or vice versa)—wherein detection of one or more of the above may be based on data, request(s) or instruction(s) received:
  at any of guest operating system application framework layer 2144, guest operating system library layer 2146, or guest operating system hardware abstraction layer 2148 within the virtual machine 214, from an application program under execution within the application program layer 2142 in the virtual machine 214, or
  at the host operating system 208 through the data channel established between the virtual machine 214 and the host operating system application software 210, or
  at the host operating system application software 210 from a host operating system hardware device driver 212.

Keymap switching based on a state of game data on disk may involve selection of a specific keymap/keymap profile in response to detection of one or more software application parameters that are retrieved from data parameters stored on disk—wherein detection of said software parameters may be based on data received:
  at any of guest operating system application framework layer 2144, guest operating system library layer 2146, or guest operating system hardware abstraction layer 2148 within the virtual machine 214, from an application program under execution within the application program layer 2142 in the virtual machine 214, or
  at the host operating system 208 through the data channel established between the virtual machine 214 and the host operating system application software 210.

Keymap switching based on a state of network traffic may involve selection of a specific keymap/keymap profile in response to detection of one or more software application parameters that are retrieved from data parameters received over a network—wherein detection of said software parameters may be based on data received:

at any of guest operating system application framework layer 2144, guest operating system library layer 2146, or guest operating system hardware abstraction layer 2148 within the virtual machine 214, from an application program under execution within the application program layer 2142 in the virtual machine 214, or at the host operating system 208 through the data channel established between the virtual machine 214 and the host operating system application software 210.

Keymap switching based on a state of input received from the cloud may involve selection of a specific keymap/keymap profile in response to detection of one or more data parameters that have been generated and stored on a cloud server based on analysis of session data collected across multiple sessions involving a user or a software application—wherein detection of said software parameters may be based on data received:

at any of guest operating system application framework layer 2144, guest operating system library layer 2146, or guest operating system hardware abstraction layer 2148 within the virtual machine 214, from an application program under execution within the application program layer 2142 in the virtual machine 214, or at the host operating system 208 through the data channel established between the virtual machine 214 and the host operating system application software 210.

Figure 5:
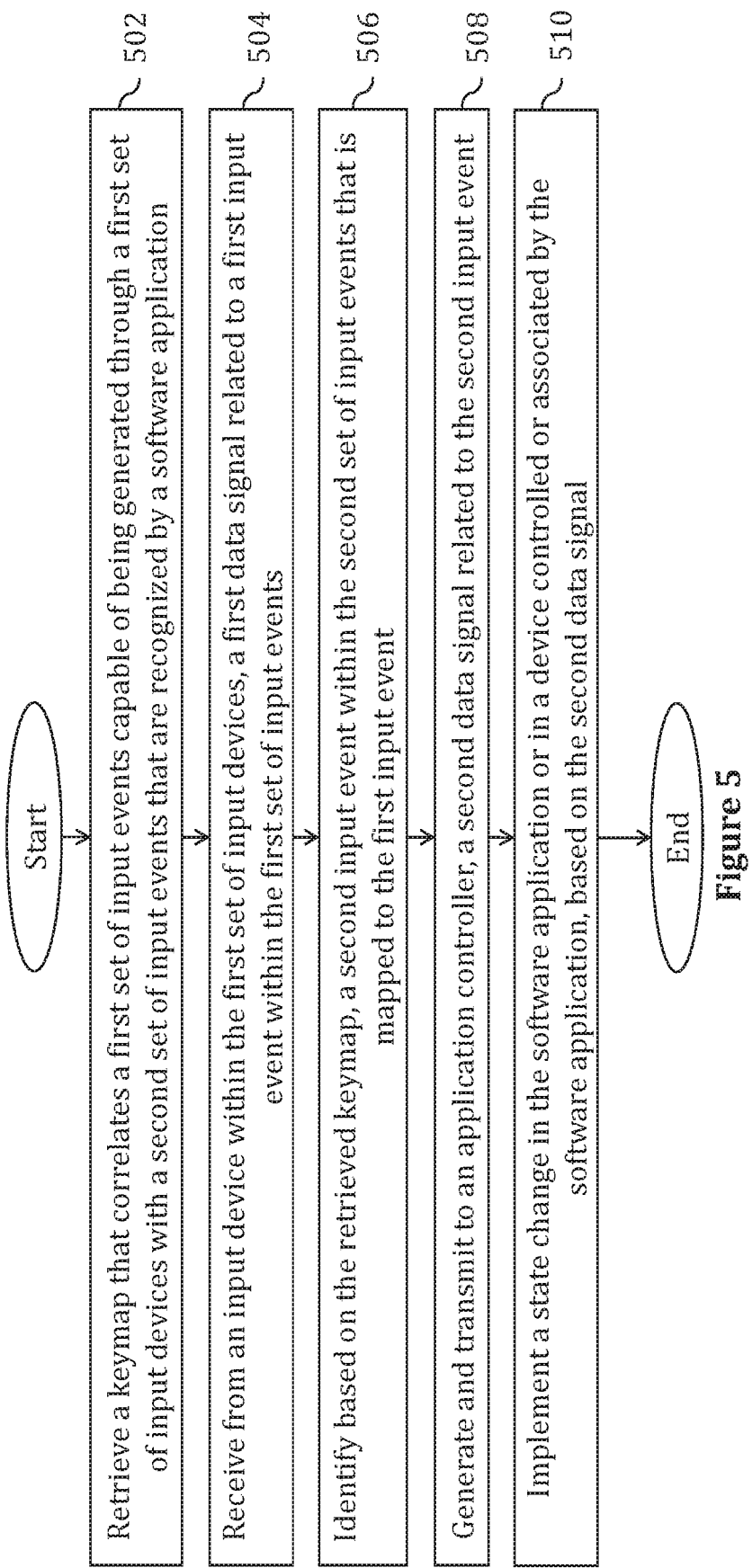
FIGS. 5 and 7 illustrate methods of input keymapping according to the teachings of the present invention.
Figure 6:
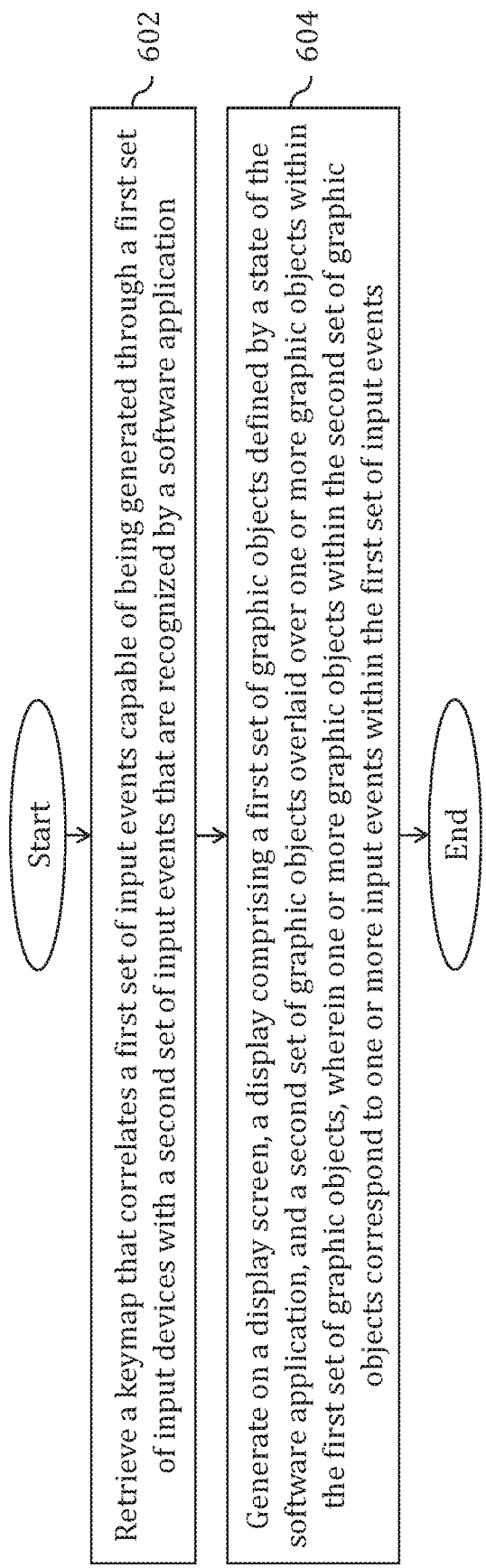
FIG. 6 illustrates a method of input keymap overlaying according to the teachings of the present invention.
Figure 7:
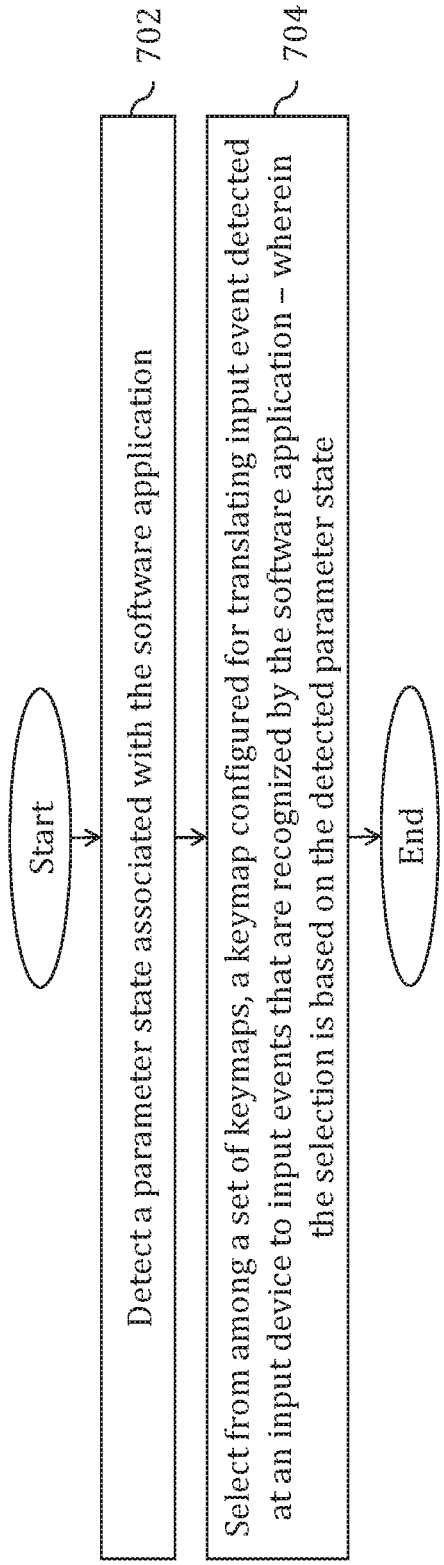

FIGS. 5 to 7 illustrate methods of input keymapping according to the teachings of the present invention.

FIG. 5 illustrates a method of keymapping in accordance with a method of the present invention—for translating inputs received from one or more input devices 304 to instructions or events capable of being detected and interpreted by a software application or game application being executed on computing system 302. In various embodiments, one or more of the method steps described below may be implemented partly or entirely within keymapping layer 3034 or within application controller 3028 within computing system 302, as described above in connection with FIGS. 3 and 4.

Step 502 comprises retrieving a keymap that correlates a first set of input events capable of being generated through one more input devices, with a second set of input events that are recognized by the software application. In an embodiment of step 502 (i) the first set of input events are not recognized by the software application, or (ii) the functionality or software response that is associated with the first set of input events (by software code corresponding to the software application) is different from the functionality or software response that is associated with the second set of input events (by the software code corresponding to the software application). In an embodiment, the keymap at step 502 is retrieved from a keymap database, by keymapping controller 3036 within keymapping layer 3034.

Step 504 comprises receiving from an input device within the first set of input devices, a first data signal or communication that identifies or is related to a first input event within the first set of input events. In an embodiment, the data signal of step 504 is received at keymapping controller 3036 within keymapping layer 3034.

Step 506 comprises identifying, based on the retrieved keymap, a second input event within the second set of input events that is mapped to the first input event. The mapping at step 506 may be implemented at keymapping controller 3036 within keymapping layer 3034.

Step 508 comprises generating and transmitting a second data signal identifying or related to the second input event. In an embodiment, the generated second data signal may be transmitted from keymapping controller 3036 and/or to application controller 3028—or more particularly to graphics controller 3030 or audio controller 3032 or any other state controller within application controller 3028. In a particular embodiment the generated second data signal is recognizable by the software application (or by the software code corresponding to the software application) as corresponding to the second input event.

Step 510 thereafter comprises implementing a state change in the software application or in any device (for example, a display, speaker, headphone, any visual feedback device, audio feedback device, illumination device, tactile feedback device, haptic feedback device, olfactory feedback device or any other sensory feedback device) controlled or associated with the software application, based on the second data signal. The state change in the software application or device may be implemented through application controller 3028 or through graphics controller 3030, audio controller 3032 or any other state controller therewithin.

In a particular embodiment, the method of FIG. 5 is implemented within a computing system having an architecture of the type illustrated in FIG. 2 (i.e. a computer implemented architecture that enables execution of application software that is configured for execution on a guest operating system that is being run as a virtual machine within a host operating system). In one such embodiment, the keymap retrieved at step 502 (i) correlates a first set of input events capable of being recognized by a hardware device driver(s) of the host operating system, with a second set of input events that are recognized by a software application being executed within a virtual instance of the guest operating system that has been instantiated within the host operating system, or (ii) correlates a first set of input events capable of being recognized by a hardware device driver(s) of the host operating system, with a second set of input events that are recognized by a hardware device driver(s) within the guest operating system kernel of the virtual instance of the guest operating system that has been instantiated within the host operating system, or (iii) correlates a first set of input events capable of being recognized by a hardware device driver(s) of the host operating system, with a second set of input events that are recognized by the guest operating system. It would further be understood that in certain embodiments, the first set of input events are not recognized by one or more of the software application being executed within a virtual instance of the guest operating system, the hardware device driver(s) within the guest operating system kernel, or the guest operating system.

FIG. 6 illustrates a method of generating an input keymap overlay and overlaying onto one or more display screens generated by a software application/game application, a current keymap or one or more visual indications regarding keys or input controls that have been associated with specific application related functionality through the method discussed in connection with FIG. 5.

In various embodiments, one or more of the method steps described below may be implemented partly or entirely within keymapping layer 3034, or within visual overlay controller 3038, or within application controller 3028 within computing system 302, as described above in connection with FIGS. 3 and 4.

Step 602 comprises retrieving a keymap that correlates a first set of input events capable of being generated through one more input devices, with a second set of input events that are recognized by the software application. In an embodiment of step 602 (i) the first set of input events are not recognized by the software application, or (ii) the functionality or software application response that is associated with the first set of input events by software code corresponding to the software application is different from the functionality or software application response that is associated with the second set of input events by the software code corresponding to the software application. In an embodiment, the keymap at step 602 is retrieved by keymapping controller 3036 within keymapping layer 3034.

Step 604 comprises generating on a display screen controlled by the software application (or by software code associated with the software application) a display comprising (i) a first set of graphic objects defined by or selected based on a state of the software application, and (ii) a second set of graphic objects overlaid upon one or more graphic objects within the first set of graphic objects, wherein one or more graphic objects within the second set of graphic objects correspond to one or more input events within the first set of input events.

In an embodiment of step 604, the second set of graphic objects comprises a representation of one or more data elements retrieved from the current keymap or one or more visual indication(s) or representation(s) of keys or input controls that are enabled to generate input events within the first set of input events (and which have been associated with the software application functionality through the keymap retrieved at step 602). By way of the example discussed previously, in a game application where the application code interprets detection of a touch event (on a touch screen or a touch pad) at a defined region of the touch screen as an instruction for a player's avatar to move in a particular direction, and where the keymap retrieved at step 602 has mapped a specific keyboard key to the same touch event, step 604 may result in overlaying of a character corresponding to the specified keyboard key at, or in the vicinity of, or at a defined position relative to, the region of the display screen that that has been defined by the application code for the purposes of initiating the touch event—and preferably on top of one or more graphic objects rendered by the gaming application on a display screen as part of the game functionality.

By implementing the method of FIG. 6 for providing such overlays, a user controlling a software application receives a visual map to the keys/controls that have been activated based on the keymap retrieved at step 602, and which keys can be used to initiate specific software application events or control instructions.

In a particular embodiment, the method of FIG. 6 is implemented within a computing system having an architecture of the type illustrated in FIG. 2 (i.e. a computer implemented architecture that enables execution of application software that is configured for execution on a guest operating system that is being run as a virtual machine within a host operating system). In one such embodiment, the keymap retrieved at step 602 (i) correlates a first set of input events capable of being recognized by a hardware device driver(s) of the host operating system, with a second set of input events that are recognized by a software application being executed within a virtual instance of the guest operating system that has been instantiated within the host operating system, or (ii) correlates a first set of input events capable of being recognized by a hardware device driver(s) of the host operating system, with a second set of input events that are recognized by a hardware device driver(s) within the guest operating system kernel of the virtual instance of the guest operating system that has been instantiated within the host operating system, or (iii) correlates a first set of input events capable of being recognized by a hardware device driver(s) of the host operating system, with a second set of input events that are recognized by the guest operating system. It would further be understood that in certain embodiments, the first set of input events are not recognized by one or more of the software application being executed within a virtual instance of the guest operating system, the hardware device driver(s) within the guest operating system kernel of the virtual instance of the guest operating system that has been instantiated within the host operating system, or the guest operating system.

FIG. 7 illustrates a method for adaptive keymapping in accordance with the teachings of the present invention—wherein the method implements event or parameter based selection of a particular keymap or keymapping profile from among a plurality of keymaps/keymapping profiles for the purposes of keymap implementation and/or keymap overlaying that has been discussed in more detail above.

Step 702 comprises detecting a hardware or software parameter state or a hardware or software parameter state change associated with the software application, or with a computing system or system environment within which the software application is being executed. In an embodiment, the parameter state or parameter state change may be detected by state detector 3040 within keymapping layer 3034 of FIG. 4. It would be understood that the parameter states or state changes that are detected at step 702 may comprise any discernable or detectable state or state change that has been predefined as being appropriate for the purposes of selecting a keymap, discarding a keymap, or changing a keymap. Exemplary state changes that may be used for the purposes of initiating a switch from a first keymap to a second keymap includes detected changes in one or more of a graphic state/visual display state, audio state, a state of data stored on transient or non-transient memory (e.g. on RAM or on permanent storage), a state of data received over a network, a state of input received from a hardware device or from the cloud, or a state of any computing system or system environment associated with execution of the software application.

Step 704 thereafter comprises selecting from among a set of keymaps, a keymap configured for translating input events detected at an input device to input events that are recognizable by the software application—wherein the selection is based on the detected parameter state or parameter state change. It would be understood that the correlation(s) between parameter state or parameter state changes on one hand and keymaps that are selected responsive to detection of such parameter state or parameter state changes, may be predefined or rule based. The selected keymap may thereafter be implemented for keymapping in accordance with the method steps of FIG. 5.

It would be understood that the method of FIG. 7 enables implementing a first keymap (i.e. a first set of keymapping associations between user inputs and software application instructions/events) in response to detection of a first state or first state change, or detection of a first parameter or a first set of parameters, and to implement a second keymap (i.e. a second set of keymapping associations between user inputs and software application instructions/events) in response to detection of a second state, or second state change, or detection of a second parameter or a second set of parameters.

In certain embodiments, adaptive keymapping according to the method of FIG. 7 may be accompanied by adaptive visual overlaying according to the method of FIG. 6—to display or indicate a particular keymap that has been adaptively selected for implementation. In particular embodiments, one or more of the keymapping profiles available for selection or adaptive selection may include keymaps that implement one-to-many functionality (i.e. macro functionality) wherein a single input event may be defined so as to result in execution of a plurality of instructions or events within a software application under execution.

In an embodiment of the method of FIG. 7, the invention may be implemented on a computing system having an architecture of the type illustrated in FIG. 2 (i.e. a computer implemented architecture that enables execution of application software that is configured for execution on a guest operating system, within a host operating system). In such embodiments involving implementation of the method of FIG. 7— keymap switching based on a graphic state or visual display state may involve selection of a specific keymap/keymap profile in response to detection of (i) predefined display screen(s), (ii) predefined graphic objects displayed on a screen or (iii) a combination of predefined graphic objects displayed in a manner that satisfies a defined set of conditions—wherein detection of one or more of the above may be based on data, request(s) or instruction(s) received:
at any of the guest operating system application framework layer 2144, guest operating system library layer 2146, or guest operating system hardware abstraction layer 2148 within the virtual machine 214, from an application program under execution within the application program layer 2142 in the virtual machine 214, or
at the host operating system 208 through the data channel established between the virtual machine 214 and the host operating system application software 210, or
at the host operating system application software 210 from a host operating system hardware device driver 212.

keymap switching based on an audio state may involve selection of a specific keymap/keymap profile in response to detection of predefined sound data or instructions or requests being communicated by the application program to an audio controller or audio device driver (or vice versa)—wherein detection of one or more of the above may be based on data, request(s) or instruction(s) received:
at any of guest operating system application framework layer 2144, guest operating system library layer 2146, or guest operating system hardware abstraction layer 2148 within the virtual machine 214, from an application program under execution within the application program layer 2142 in the virtual machine 214, or
at the host operating system 208 through the data channel established between the virtual machine 214 and the host operating system application software 210, or
at the host operating system application software 210 from a host operating system hardware device driver 212.

Keymap switching based on a state of game data on disk may involve selection of a specific keymap/keymap profile in response to detection of one or more software application parameters that are retrieved from data parameters stored on disk—wherein detection of said software parameters may be based on data received:
at any of guest operating system application framework layer 2144, guest operating system library layer 2146, or guest operating system hardware abstraction layer 2148 within the virtual machine 214, from an application program under execution within the application program layer 2142 in the virtual machine 214, or
at the host operating system 208 through the data channel established between the virtual machine 214 and the host operating system application software 210.

Keymap switching based on a state of network traffic may involve selection of a specific keymap/keymap profile in response to detection of one or more software application parameters that are retrieved from data parameters received over a network—wherein detection of said software parameters may be based on data received:
at any of guest operating system application framework layer 2144, guest operating system library layer 2146, or guest operating system hardware abstraction layer 2148 within the virtual machine 214, from an application program under execution within the application program layer 2142 in the virtual machine 214, or
at the host operating system 208 through the data channel established between the virtual machine 214 and the host operating system application software 210.

Keymap switching based on a state of input received from the cloud may involve selection of a specific keymap/keymap profile in response to detection of one or more data parameters that have been generated and stored on a cloud server based on analysis of session data collected across multiple sessions involving a user or a software application—wherein detection of said software parameters may be based on data received:
at any of guest operating system application framework layer 2144, guest operating system library layer 2146, or guest operating system hardware abstraction layer 2148 within the virtual machine 214, from an application program under execution within the application program layer 2142 in the virtual machine 214, or
at the host operating system 208 through the data channel established between the virtual machine 214 and the host operating system application software 210.

Figure 8:
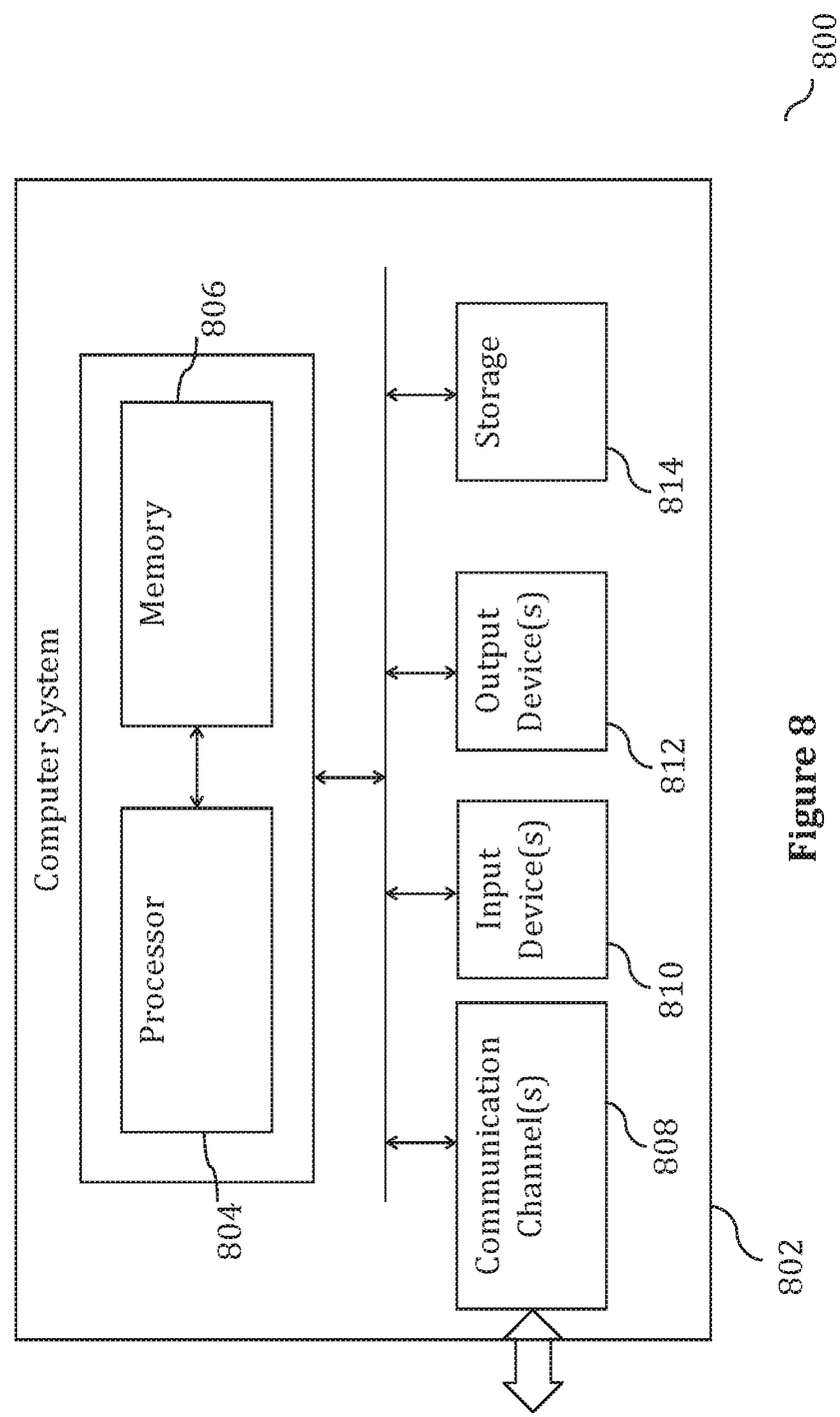
FIG. 8 illustrates an exemplary computing system of a type that may be used to implement the invention.

FIG. 8 illustrates an exemplary computer system 802 for implementing the present invention.

The illustrated system comprises computer system 802 which in turn comprises one or more processors 804 and at least one memory 806. Processor 804 is configured to execute program instructions—and may be a real processor or a virtual processor. It will be understood that computer system 802 does not suggest any limitation as to scope of use or functionality of described embodiments. The computer system 802 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 802 in accordance with the present invention may include one or more servers, desktops, laptops, tablets, smart phones, mobile phones, mobile communication devices, tablets, phablets and personal digital assistants. In an embodiment of the present invention, the memory 806 may store software for implementing various embodiments of the present invention. The computer system 802 may have additional components. For example, the computer system 802 may include one or more communication channels 808, one or more input devices 810, one or more output devices 812, and storage 814. An interconnection mechanism (not shown) such as a bus, controller, or network, interconnects the components of the computer system 802. In various embodiments of the present invention, operating system software (not shown) provides an operating environment for various softwares executing in the computer system 802 using a processor 804, and manages different functionalities of the components of the computer system 802.

The communication channel(s) 808 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 810 may include, but is not limited to, a touch screen, a keyboard, mouse, pen, joystick, trackball, a voice device, a scanning device, or any another device that is capable of providing input to the computer system 802. In an embodiment of the present invention, the input device(s) 810 may be a sound card or similar device that accepts audio input in analog or digital form. The output device(s) 812 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 802.

The storage 814 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 802. In various embodiments of the present invention, the storage 814 may contain program instructions for implementing any of the described embodiments.

In an embodiment of the present invention, the computer system 802 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 802. The method described herein is typically implemented as a computer program product, comprising a set of program instructions that is executed by the computer system 802 or any other similar device. The set of program instructions may be a series of computer readable codes stored on a tangible medium, such as a computer readable storage medium (storage 814), for example, diskette, CD-ROM, ROM, flash drives or hard disk, or transmittable to the computer system 802, via a modem or other interface device, over either a tangible medium, including but not limited to optical or analogue communications channel(s) 808. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The present invention accordingly provides effective solutions to map inputs received from one or more controllers or user interfaces communicatively coupled to a computing device on which a software application is being executed, to one or more instructions or events that said software application is configured to recognize.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

The invention claimed is:

1. A method for mapping inputs to a software application, comprising implementing with one or more processors, the steps of:

executing the software application within an instance of a guest operating system that is implemented within a host operating system, wherein the guest operating system and the host operating system are different from each other, wherein each of the software application, the guest operating system and the host operating system are implemented within a single computing device, and wherein the guest operating system is launched by a host operating system software application that emulates a hardware architecture capable of implementing the guest operating system;

receiving a keymap that correlates a first set of input events capable of being generated through an input device with a second set of input events that are recognizable by the software application, wherein the second set of input events includes one or more input events that are not included within the first set of input events, wherein:

the first set of input events are recognizable by a hardware device driver compatible with and executed within the host operating system; and the second set of input events are recognizable by the software application being executed within the instance of the guest operating system, recognizable by a hardware device driver within an operating system kernel of the guest operating system, or recognizable by the guest operating system;

receiving, from the input device, a first data signal associated with a first input event within the first set of input events;

identifying, based on the received keymap, a second input event within the second set of input events, wherein the second input event is mapped to the first input event by the keymap;

generating a second data signal, wherein the second data signal is recognizable by the software application as corresponding to the second input event; and implementing a state change in the software application based on the second data signal.

2. The method as claimed in claim 1, wherein the state change implemented in the software application instantiates a corresponding state change in an output device controlled by the software application.

3. The method as claimed in claim 2, wherein the output device is any of a display, a speaker, a headphone, a visual feedback device, an audio feedback device, an illumination device, a tactile feedback device, a haptic feedback device, or a sensory feedback device.

4. The method as claimed in claim 1, wherein the first set of input events are not recognizable by the software application, or the software response that is associated with the first set of input events by the software application is different from the software response that is associated with the second set of input events by the software application.

5. The method as claimed in claim 1, wherein the second data signal is transmitted to the software application within the guest operating system from a host operating system application software that instantiates and controls the instance of the guest operating system that is being implemented within the host operating system.

6. The method as claimed in claim 1, further comprising:
generating on a display controlled by the software application:
a first set of graphic objects defined by or selected based on a state of the software application; and
a second set of graphic objects overlaid upon one or more graphic objects within the first set of graphic objects, wherein one or more graphic objects within the second set of graphic objects represent one or more input events within the first set of input events.

7. The method as claimed in claim 6, wherein the second set of graphic objects comprises:
a visual representation of one or more data elements retrieved from the keymap; or
a visual representation of one or more input controls that are enabled to generate input events within the first set of input events.

8. The method as claimed in claim 7, wherein:
one or more input events within the second set of input events are touchpress events initiated through a touchscreen interface; and
a graphic object within the second set of graphic objects is overlaid on the touchscreen display at a defined position relative to a region of the display screen that has been defined by the software application for the purposes of initiating a touchpress event within the second set of input events, and the touchpress event is correlated by the keymap with an input event within the first set of input events that corresponds to said graphic object.

9. The method as claimed in claim 1, wherein:
the keymap is selected from among a plurality of keymaps;

wherein the selection of the keymap is responsive to detection of one or more predefined state parameters, and the one or more predefined state parameters are hardware or software state parameters.

10. The method as claimed in claim 9, wherein the one or more predefined state parameters comprise any of a visual display state parameter, an audio state parameter, a state parameter corresponding to data stored in memory, a state parameter corresponding to data received over a network, a state parameter corresponding to input received from a hardware device, or a state parameter corresponding to any computing system or computing system environment associated with execution of the software application.

11. The method as claimed in claim 9, wherein:
one or more of the state parameters are detected based on data, a request, or an instruction received at or from any of:
an application framework layer within the instance of the guest operating system;
a library layer within the instance of the guest operating system;
a hardware abstraction layer within the instance of the guest operating system;
an application program executed within an application program layer in the guest operating system;
the host operating system through a data channel established between the instance of the guest operating system and a host operating system application software that instantiates and controls the instance of the guest operating system that is being implemented with the host operating system; or
the host operating system application software from a host operating system device driver.

12. A system for mapping inputs to a software application, the system comprising a processor configured to:
execute the software application within an instance of a guest operating system that is implemented within a host operating system,
wherein the guest operating system and the host operating system are different from each other,
wherein each of the software application, the guest operating system and the host operating system are implemented within a single computing device, and
wherein the guest operating system is launched by a host operating system software application that emulates a hardware architecture capable of implementing the guest operating system;
receive a keymap that correlates a first set of input events capable of being generated through an input device with a second set of input events that are recognizable by the software application, wherein the second set of input events includes one or more input events that are not included within the first set of input events, wherein:
the first set of input events are recognizable by a hardware device driver compatible with and executed within the host operating system; and
the second set of input events are recognizable by the software application being executed within the instance of the guest operating system, recognizable by a hardware device driver within an operating system kernel of the guest operating system, or recognizable by the guest operating system;
receive, from the input device, a first data signal associated with a first input event within the first set of input events;

identify, based on the received keymap, a second input event within the second set of input events, wherein the second input event is mapped to the first input event by the keymap;

generate a second data signal, wherein the second data signal is recognizable by the software application as corresponding to the second input event; and implement a state change in the software application based on the second data signal.

13. The system as claimed in claim 12, wherein the state change implemented in the software application instantiates a corresponding state change in an output device controlled by the software application.

14. The system as claimed in claim 13, wherein the output device is any of a display, a speaker, a headphone, a visual feedback device, an audio feedback device, an illumination device, a tactile feedback device, a haptic feedback device, or a sensory feedback device.

15. The system as claimed in claim 12, wherein the first set of input events are not recognizable by the software application, or the software response that is associated with the first set of input events by the software application is different from the software response that is associated with the second set of input events by the software application.

16. The system as claimed in claim 12, wherein the second data signal is transmitted to the software application within the guest operating system from a host operating system application software that instantiates and controls the instance of the guest operating system that is being implemented within the host operating system.

17. The system as claimed in claim 12, configured for:
generating on a display controlled by the software application:
a first set of graphic objects defined by or selected based on a state of the software application; and
a second set of graphic objects overlaid upon one or more graphic objects within the first set of graphic objects, wherein one or more graphic objects within the second set of graphic objects represent one or more input events within the first set of input events.

18. The system as claimed in claim 17, wherein the second set of graphic objects comprises:
a visual representation of one or more data elements retrieved from the keymap; or
a visual representation of one or more input controls that are enabled to generate input events within the first set of input events.

19. The system as claimed in claim 18, wherein:
one or more input events within the second set of input events are touchpress events initiated through a touchscreen interface; and
a graphic object within the second set of graphic objects is overlaid on the touchscreen display, at a defined position relative to a region of the display screen that has been defined by the software application for the purposes of initiating a touchpress event within the second set of input events, and the touchpress event is correlated by the keymap with an input event within the first set of input events that corresponds to said graphic object.

20. The system as claimed in claim 12, wherein:
the keymap is selected from among a plurality of keymaps;
wherein the selection of the keymap is responsive to detection of one or more predefined state parameters, and the one or more predefined state parameters are hardware or software state parameters.

21. The system as claimed in claim 20, wherein the one or more predefined state parameters comprise any of a visual display state parameter, an audio state parameter, a state parameter corresponding to data stored in memory, a state parameter corresponding to data received over a network, a state parameter corresponding to input received from a hardware device, or a state parameter corresponding to any computing system or computing system environment associated with execution of the software application.

22. The system as claimed in claim 20, wherein:
one or more of the state parameters are detected based on data, a request or an instruction received at or from any of:
an application framework layer within the instance of the guest operating system;
a library layer within the instance of the guest operating system;
a hardware abstraction layer within the instance of the guest operating system;
an application program executed within an application program layer in the guest operating system;
the host operating system through a data channel established between the instance of the guest operating system and a host operating system application software that instantiates and controls the instance of the guest operating system that is being implemented with the host operating system; or
the host operating system application software from a host operating system device driver.

23. A computer program product for mapping inputs to a software application, the computer program product comprising a non-transitory computer usable medium having computer readable program code embodied therein, the computer readable program code comprising instructions for instructing a processor to:
execute the software application within an instance of a guest operating system that is implemented within a host operating system,
wherein the guest operating system and the host operating system are different from each other,
wherein each of the software application, the gust operating system and the host operating system are implemented within a single computing device, and
wherein the guest operating system is launched by a host operating system software application that emulates a hardware architecture capable of implementing the guest operating system;
receive a keymap that correlates a first set of input events capable of being generated through an input device with a second set of input events that are recognizable by the software application, wherein the second set of input events includes one or more input events that are not included within the first set of input events, wherein:
the first set of input events are recognizable by a hardware device driver compatible with and executed within the host operating system; and
the second set of input events are recognizable by the software application being executed within the instance of the guest operating system, recognizable by a hardware device driver within an operating system kernel of the guest operating system, or recognizable by the guest operating system;

receive, from the input device, a first data signal associated with a first input event within the first set of input events;

identify, based on the received keymap, a second input event within the second set of input events, wherein the second input event is mapped to the first input event by the keymap;

generate a second data signal, wherein the second data signal is recognizable by the software application as corresponding to the second input event; and implement a state change in the software application based on the second data signal.

\* \* \* \* \*

UNITED STATES PATENT AND TRADEMARK OFFICE
CERTIFICATE OF CORRECTION

PATENT NO. : 11,169,687 B2  
APPLICATION NO. : 16/447018  
DATED : November 9, 2021  
INVENTOR(S) : Agrawal et al.

Page 1 of 1

It is certified that error appears in the above-identified patent and that said Letters Patent is hereby corrected as shown below:

In the Claims

Column 26, Line 45, Claim 23, delete "gust" and insert -- guest --

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*